United States Patent [19]

Maida

[11] 4,329,036
[45] May 11, 1982

[54] POWER SUPPLY CIRCUIT FOR CAMERA

[75] Inventor: Osamu Maida, Tokyo, Japan

[73] Assignee: Nippon Kogaku K.K., Tokyo, Japan

[21] Appl. No.: 114,203

[22] Filed: Jan. 22, 1980

[30] Foreign Application Priority Data

Feb. 1, 1979 [JP] Japan ............................. 54-10748[U]

[51] Int. Cl.³ ............................ G03B 1/00; G03B 7/08
[52] U.S. Cl. .................................. 354/60 A; 354/173
[58] Field of Search ............. 354/234, 235, 173, 60 R, 354/266, 50, 51, 60 A, 43, 44

[56] References Cited

U.S. PATENT DOCUMENTS 3,853,396 12/1974 Ogiso et al. ......................... 354/173
4,091,395 5/1978 Kozuki et al. ...................... 354/173
4,096,496 6/1978 Numata ............................. 354/60 A Primary Examiner—L. T. Hix
Assistant Examiner—W. J. Brady
Attorney, Agent, or Firm—Fitzpatrick, Cella, Harper & Scinto

[57] ABSTRACT

A power supply circuit for use in a camera comprising solenoids for shutter release or shutter control etc. to be controlled by the proper vibration frequency of a piezoelectric element, comprising a constant voltage circuit for generating electric power for driving said solenoids, a switching circuit for supplying electric power from a power source of a motor drive unit to said constant voltage circuit in response to the actuation of a shutter button, and a voltage converting circuit for continuously supplying electric power from said power source of said motor drive unit to an oscillation circuit containing said piezoelectric element.

15 Claims, 1 Drawing Figure

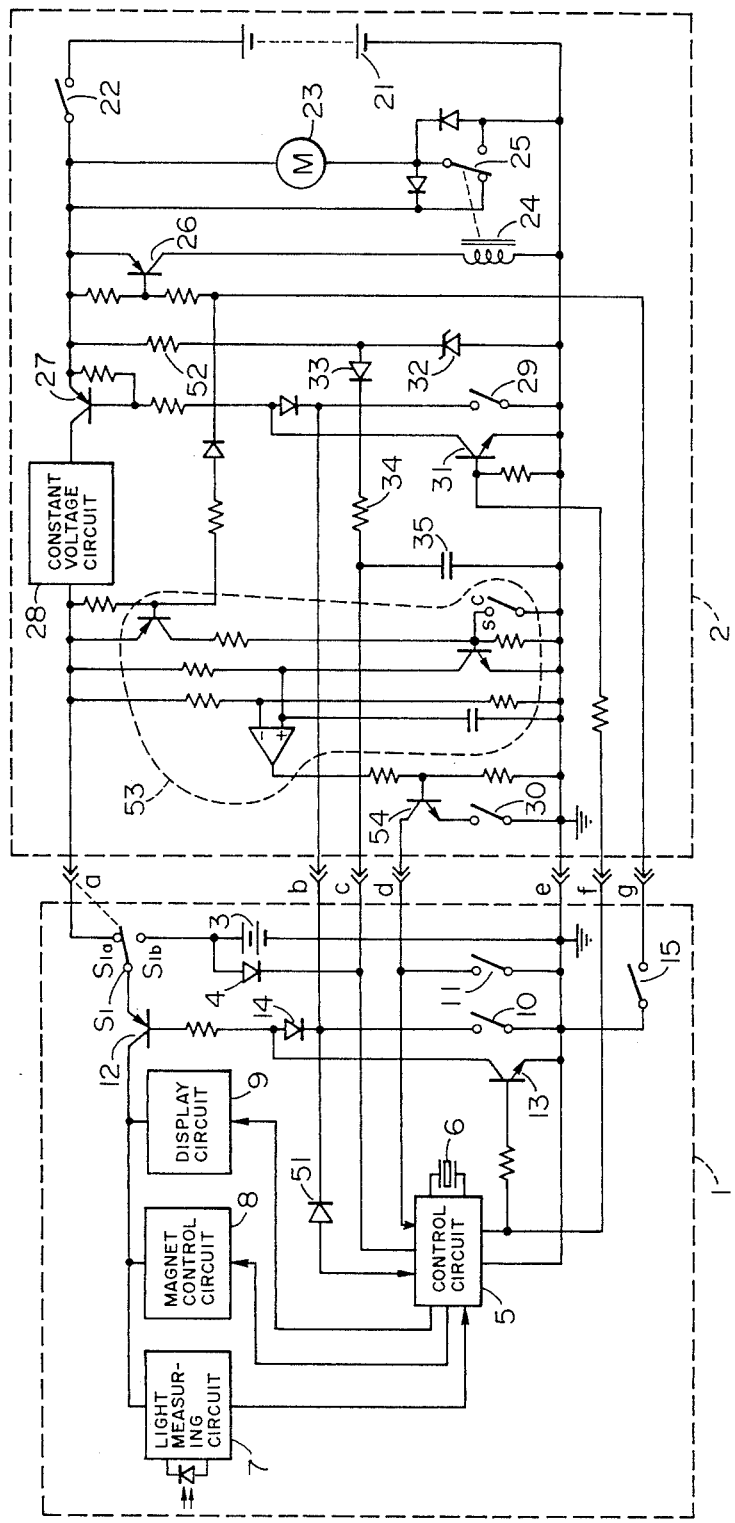

POWER SUPPLY CIRCUIT FOR CAMERA

BACKGROUND OF THE INVENTION

1. Field of the Invention

The present invention relates to a power supply circuit for supplying electric power from a power source of a motor drive unit to a shutter control solenoid etc. in a camera.

2. Description of the Prior Art

Also there is known a camera comprising an oscillation circuit utilizing a quartz or ceramic piezoelectric element, the proper vibration frequency of which is utilized for driving the shutter control solenoid or conducting the sequence control of a solenoid release device. Although such camera is advantageous in allowing precise control of the solenoid etc. by the stable proper vibration frequency of the piezoelectric element, the oscillation circuit involving said element has to be continuously powered since such circuit requires a relatively long period of reaching a stable oscillation state after the start of power supply thereto.

Thus, in case of driving the aforementioned shutter control solenoid and oscillation circuit by the power source of the motor drive unit, satisfactory control cannot be achieved as the photographing operation is completed before the oscillation circuit reaches the stable oscillation state if said circuit and the solenoid are to be operated by the output from a constant-voltage circuit receiving the power supply in response to the actuation of the shutter button. On the other hand if said constant-voltage circuit continuously receives the power supply even before the actuation of the shutter button, there will result a drawback of significant power waste in said constant-voltage circuit when the camera is not in use as said circuit has to be designed to provide a large power output for driving the shutter control solenoid etc.

SUMMARY OF THE INVENTION

The object of the present invention is to provide a power supply circuit for a camera capable of avoiding unnecessary power waste in the constant-voltage circuit for driving the shutter control solenoid etc. when the camera is not in the photographing operation, and of maintaining the oscillation circuit involving the piezoelectric element always in a stable oscillation state at the photographing operation to achieve proper control of the solenoid.

BRIEF DESCRIPTION OF THE DRAWINGS

The attached drawing is a circuit diagram of an embodiment of the present invention.

DESCRIPTION OF THE PREFERRED EMBODIMENTS

The present invention will now be detailed by the following description of an embodiment thereof shown in the attached drawing, in which 1 and 2 are circuit blocks respective of the camera and the motor drive unit which are mutually connected electrically through electric contacts a, b, c, d, e, f and g and mechanically through unrepresented coupling means for actuating a film winding device of the camera.

In the circuit block of the camera, there are provided a power source 3 provided in the camera; a switch S1 automatically changed over to a contact S1a thereof upon coupling of the motor drive unit so as to be connected to a power source therein or to a contact S1b upon detaching said motor drive unit so as to be connected to said power source 3; a diode 4; a control circuit 5 receiving power supply from said power source 3 when the motor drive unit is detached and comprising an oscillation circuit for generating a precise frequency by the proper vibration frequency of a piezoelectric element 6 contained therein and a circuit for conducting digital calculation for exposure control and sequence control, wherein said control circuit 5 is composed of a CMOS or $I^2L$ element for power economization; a light measuring circuit 7 for supplying the control circuit 5 with digitalized light-measurement signal for exposure control; a solenoid control circuit 8 comprising a shutter control solenoid, an aperture control solenoid, a release solenoid etc. and controlled by the output of said control circuit 5; a display circuit 9 comprising light-emitting diodes, liquid crystal display elements or a meter for indicating the controlled values of the exposure; a half-push switch 10 to be closed in response to a half push of the unrepresented shutter button to activate a transistor 12 thereby initiating the power supply to the circuits 7, 8 and 9 and also to render a transistor 13 conductive through a diode 51 and the control circuit 5 which maintains said conductive state for a determined period after the opening of said switch 10 and also maintains the power supply through the transistor 12 even when said switch 10 is turned off during the exposure; a release switch 11 to be closed upon further pushing down of the shutter button to supply a release signal to the control circuit 5 to initiate the exposure control; and a film winding switch 15 to be closed upon completion of the exposure operation and opened upon completion of the film winding operation.

When the motor drive unit is not mounted, the camera functions in the following manner. Prior to the actuation of the shutter button, the power source 3 supplies the electric power through the diode 4 to the control circuit 5, which thus continuously maintains the oscillation circuit in the oscillation state. In response to a half push of the shutter button, the aforementioned switch 10 is closed to activate the transistor 12 thereby initiating the power supply to the light-measuring circuit 7, solenoid control circuit 8 and display circuit 9. Thus said circuit 7 supplies the light measurement signal to the control circuit 5, which thus performs the calculation for exposure control and the determination of sequence timing on the basis of the ouput from said oscillation circuit. The output from the control circuit 5 is transmitted to the display circuit 9 to perform the display of controlled values of the exposure. Also the control circuit 5 receives the half-push signal from said switch 10, whereby said control circuit 5 maintains transistor 13 in conductive state for a determined period after the opening of said switch 10, during which the power supply to the circuits, 7, 8 and 9 is maintained. Upon further pressing down of the shutter button, the release switch 11 is closed to transmit the release signal to the control circuit 5, whereby the solenoid control circuit 8 including the shutter control solenoid is controlled so as to perform the photographing operation with an appropriate exposure. In the present embodiment during the exposure control the transistor 13 is maintained conductive by the control circuit 5 as explained in the foregoing.

In the circuit block of the motor drive unit there are provided a power source 21 of the motor drive unit; a main power switch 33; a motor 23 controlled by a relay switch 25 in turn controlled by a relay coil 24 which shifts said switch 25 as to drive the motor 23 when a transistor 26 is rendered conductive through a contact g in response to the closure of the winding switch 15 in the camera; a constant-voltage circuit 28 for obtaining a low constant voltage for the aforementioned circuits 7, 8 and 9 from the voltage of the power source 21 of the motor drive unit and performing the power supply to said circuits through the contact a in response to the turning on of a switching circuit composed of a transistor 27; a half-push switch 29 to be closed by a half-push of an unrepresented shutter button of the motor drive unit; and a release switch 30 to be closed upon further pressing down of said shutter button.

In response to the closing of said half-push switch 29 a transistor 27 is rendered conductive to initiate the power supply from the constant-voltage circuit 28. Simultaneously the transistor 12 is rendered conductive through a contact b and the control circuit 5 receives the half-push signal through the diode 51 to render the transistor 13 conductive and also to shift, through a contact f, a transistor 31 to the conductive state, which is maintained for a determined period after the opening of the switch 29 in a similar manner as already explained with respect to the function of the camera. Consequently the constant-voltage circuit 28 and the transistor 12 are controlled in synchronized manner by the transistor 27. A resistor 52 and a low-current Zener diode 32, showing the Zener characteristic at a low current, constitute a voltage converting circuit for obtaining a low constant voltage to be supplied to the control circuit 5 from the output voltage of the power source 21 of the motor drive unit. However said Zener diode may be replaced by plural diodes connected in series for obtaining the desired voltage. The output of said voltage converting circuit 52, 32 is supplied to the control circuit 5 through a diode 33, a low-pass filter composed of a resistor 34 and a condenser 35, and a contact c. Said low-pass filter is provided for reducing the motor noise, while said diode 33 is provided in order to prevent unnecessary power consumption caused by the current from the power source 3 of the camera to the circuits in the motor drive unit in case the power source 21 is removed for example for replacing an old battery with a new one.

In the above-explained circuit, a voltage is generated across the Zener diode upon closure of the main switch 22, and the power supply to the control circuit 5 is conducted not by the power source 3 through the diode 4 but by the power source 21 of the motor drive unit if the voltage across the condenser 35 is adjusted approximately equal to the voltage of said power source 3. Said power supply is performed by the power source 3 in case the voltage thereof exceeds the voltage across the condenser 35 as the result of exhaustion of the power source 21. As long as said power source remains unexhausted, the circuits remain operative even if the power source 3 is removed. The power consumption in the control circuit 5 can be made very small for example by composing said circuit with a CMOS element, and the current consumption in the resistor 34 can also be made negligibly small by the use of a Zener diode function with a low current or by the use of serially connected plural diodes, and in such case the main switch 22 may be dispensed with since such power consumption is negligibly small with respect to the power source 21 even if the switch 22 is continuously closed. 53 is a power supply circuit for continuously supplying, in case of frame-by-frame photographing, power to a transistor 54 which supplies a release signal to the control circuit 5 in response to the closing of the release switch 30. Also in case of continuous photographing operation, said circuit 53 supplies the power to the transistor 54 upon completion of each winding operation, whereby the release signal is supplied from the transistor 54 to the control circuit 5 upon completion of each winding operation as long as the release switch 30 is maintained closed. In response to said signal from the transistor 54, said control circuit 5 initiates the exposure sequence.

Consequently the camera performs the following function when combined with the motor drive unit. Prior to the actuation of the unrepresented shutter button of the motor drive unit, the power source 21 of the motor drive unit supplies power continuously to the voltage converting circuit 32, 52 of the reduced power consumption and also to the control circuit 5 through the diode 33 to maintain the oscillation circuit in a stable oscillation. In this state the constant voltage circuit 28 is cut off from the power supply to prevent unnecessary power consumption therein.

In response to a half-push of the shutter button, the half-push switch 29 is closed to activate the transistor 27 thereby initiating power supply to the constant voltage circuit 28, and simultaneously to activate the transistor 12 through the contact b to initiate the power supply to the light-measuring circuit 7, solenoid control circuit 8 and display circuit 9, whereby the control circuit 5 receives the light measurement signal from said light-measuring circuit 7 to perform the calculation for exposure control and the determination of sequency timing on the basis of the output from said oscillation circuit in the aforementioned manner, and the display circuit 9 performs the appropriate display. Upon further pressing down of the shutter button the release switch 30 is closed to transmit the release signal to the control circuit 5 through the transistor 54, whereby the solenoid control circuit 8 is controlled to perform the photographing operation with appropriate exposure. When the switch 29 is turned off, the transistors 13 and 31 are thereafter maintained conductive for a determined period as explained in the foregoing to maintain the power supply to the circuits 7, 8 and 9. Naturally the power supply to said circuits 7, 8 and 9 is continued during the exposure control as the transistors 13 and 31 are maintained conductive by the control circuit 5. Upon completion of the exposure the film winding switch 15 is closed to energize the relay coil 24 through the transistor 26, thereby starting the motor 23 and thus driving the film winding device of the camera through unrepresented coupling means. Upon completion of the film winding the switch 15 is opened to terminate the function of the motor 23. In case the shutter button is still pressed to close the release switch 30 and the circuit 53 is in the continuous photographing mode, the transistor 54 generates another release signal to repeat the photographing operation. Naturally such repeated photographing operation is not conducted if the circuit 53 is in the single frame mode or if the release switch 30 is opened.

The voltage converting circuit 52, 32 may also be provided, instead of being provided in the motor drive unit as illustrated, in the camera circuit block in such a manner as to be connected to the power source 21 through the resistor 52 upon mounting of the motor drive unit to the camera. Furthermore, the diode 4, provided for preventing inverse current from said voltage converting circuit 52, 32 to the power source 3, may be dispensed with if a switch similar to S1 is provided on the contact c to isolate the power source 3 completely from the circuit 52, 32. Furthermore, the motor drive unit which has been explained as separable from the camera may be incorporated in the camera body itself. The term "motor drive unit" used herein naturally includes so-called automatic winder. Although the foregoing embodiment is related to a camera with automatic exposure control, it will be evident that the present invention is also applicable to other cameras as long as there are involved solenoids for shutter release, shutter control etc. to be controlled by the proper vibration frequency of the piezoelectric element.

As detailedly explained in the foregoing, the present invention, performing continuous power supply to an oscillation circuit involving a piezoelectric element from a power source of the motor drive unit through a voltage converting circuit, contributes means for prevention of the transient instability of the oscillation and maintenance of a stable oscillation in said oscillation circuit, thereby enabling adequate control of various solenoids by the proper vibration frequency of said piezoelectric element. Also the present invention avoids unnecessary power consumption in the constant voltage circuit for driving the shutter control solenoid etc. as said circuit is structured separately and receives power supply only when the shutter button is actuated. Furthermore, as the solenoids and the oscillation circuit receive the power supply from the power source of the motor drive unit, it is possible to prevent the inconvenience which occurs when a power source for solenoids is provided separately from the power source for the motor drive unit, which inconvenience may lead to disabled solenoid function or disabled continuous photographing in case said separate power source is exhausted even when the power source for the motor drive remains operative.

We claim:

1. In a system for a camera comprising a motor for film winding, a power source for supplying power to the motor, a first constant voltage circuit for converting output voltage of the power source to a constant voltage lower than the said output voltage and a solenoid for effecting exposure control upon receipt of the output voltage of the first constant voltage circuit, the improvement comprising a switching circuit connected between said power source and said first constant voltage circuit and supplying power to said first constant voltage circuit from said power source upon depression of a shutter button;

an oscillation circuit including a piezoelectric element, the oscillation circuit causing oscillation by the proper vibration frequency of the piezoelectric element and controlling said solenoid by the oscillation;

a second constant voltage circuit whose current consumption is small, the second constant voltage circuit converting the output voltage of said power source to a constant voltage lower than said output voltage of the power source and transmitting the thus converted constant voltage always to said oscillation circuit to hold always the oscillation circuit in a stable oscillation state.

2. A system according to claim 1, wherein said solenoid controls shutter operation.

3. A system according to claim 1, wherein said solenoid controls shutter release.

4. A system according to claim 1, wherein said solenoid controls the camera aperture.

5. In a motor drive system for a camera, comprising a camera body (1) and a motor drive unit (2), wherein the camera body includes a first power source circuit (3), a first control circuit (5,7,8,9) for electrically controlling light measurement and exposure operation and a first power supply circuit (12) for supplying electric power from the first power source circuit to the first control circuit, and the motor drive unit (2) is detachable relative to the camera body and includes a second power source circuit (21) and a constant voltage circuit (28) to which power is supplied from the second power source circuit and from which a constant voltage is applied to the first power supply circuit; the improvement comprising a second power supply circuit (27) from said second power source circuit to said constant voltage circuit, and means (10;29) for actuating said first and second power supply circuits at the same time in association with a photo-taking operation.

6. A motor drive system according to claim 5, wherein said camera includes a shutter button and said photo-taking operation includes depression of shutter button, and said actuating means (10;29) actuates said first and second power supply circuit in association with depression of the shutter button.

7. A motor drive system according to claim 5, wherein said second power supply circuit (27) and said actuating means (29) are provided in the motor drive unit.

8. A motor drive system according to claim 7, wherein said photo-taking operation includes depression of the shutter button, and said motor drive unit includes a signal circuit (30, 54) which generates a shutter release signal upon depression of the shutter button and transmits the release signal to said first control circuit.

9. A motor drive system according to claim 5, wherein said second power supply circuit (27) is provided in said motor drive unit and said actuating means (10) is provided in said camera body.

10. A motor drive system according to claim 5, further comprising a circuit (13,31) for actuating said first and second power supply circuits during a predetermined time interval after termination of actuation of said actuating means.

11. A motor drive system according to claim 5, further comprising a circuit (13,31) for keeping actuation of said first and second power supply circuits from occurring until initiation of the exposure operation is completed.

12. A motor drive system according to claim 5, further comprising switching means (S$_1$) for connecting said first power supply circuit with said first power source circuit when said motor drive unit is not mounted on said camera body, and connecting said first power supply circuit with said constant voltage circuit in association with mounting operation of the motor drive unit onto the camera body.

13. A motor drive system according to claim 5, wherein said motor drive unit has a film winding-up motor (23) connected to said second power source circuit (21), and said second power supply circuit is connected at its one end to said motor (23) and to said second power source circuit (21) and at its other end to said constant voltage circuit.

14. In a motor drive unit detachably mountable to a camera body which comprises a first power source circuit (3), a first control circuit (5,7,8,9) for controlling electrically light-measurement and exposure operation and a first power supply circuit (12) for supplying electric power from the first power source circuit to the first control circuit, the motor drive unit comprising a second power source circuit (21) and a constant voltage circuit (28) to which electric power is supplied from the second power source circuit and from which a constant voltage is issued to said first power supply circuit, the improvement comprising a second power supply circuit (27) for controlling power supply from said second power supply circuit to said constant voltage circuit, and means (29) for actuating said first and second power supply circuits at the same time in association with a photo-taking operation.

15. A motor drive unit according to claim 14, wherein said actuating means actuates said first and second power supply circuits in association with depression of the shutter button.

* * * * *

UNITED STATES PATENT AND TRADEMARK OFFICE
CERTIFICATE OF CORRECTION

PATENT NO. : 4,329,036

DATED : May 11, 1982

INVENTOR(S) : OSAMU MAIDA

It is certified that error appears in the above—identified patent and that said Letters Patent is hereby corrected as shown below:

Column 1, line 11, "Also there" should be --There--;
line 21, "of" should be --for--;
line 60, "respective" should be --respectively--.
Column 4, line 33, "sequency" should be --sequence--.

Signed and Sealed this

Thirteenth Day of July 1982

[SEAL]

Attest:

GERALD J. MOSSINGHOFF

Attesting Officer

Commissioner of Patents and Trademarks